Dec. 22, 1964 HISATO WAKAMATSU 3,162,790
TRANSISTOR RELAY CIRCUIT
Filed Dec. 21, 1960
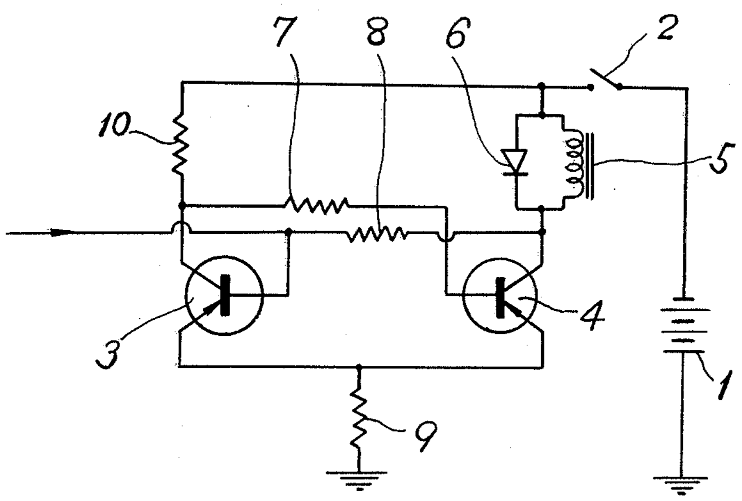
INVENTOR.
HISATO WAKAMATSU
BY
McGlew and Toren United States Patent Office 3,162,790
Patented Dec. 22, 1964

3,162,790
TRANSISTOR RELAY CIRCUIT
Hisato Wakamatsu, 1–2 Tado, Koshido, Sanagecho, Nishikamo-gun, Aichi-ken, Japan
Filed Dec. 21, 1960, Ser. No. 77,332
Claims priority, application Japan, Mar. 10, 1960, 35/7,417/60
1 Claim. (Cl. 317—148.5)

This invention relates to a transistor relay circuit.

More particularly, this invention relates to an improvement in or relating to a highly sensible relay device comprising in combination a relay and a bistable multivibrator using transistors.

In a bistable multivibrator with two transistors, actuation of each of the transistors is performed always either in the conducting state or in the blocking state, so that output loss of the transistors can be maintained at a minimum, resulting in diminution of temperature influences on the transistors.

In order to obtain a highly sensitive relay device without using any special accessories, according to this invention a transistor relay circuit is provided, which comprises in combination a bistable multivibrator with two transistors and a relay coil inserted into a portion of the circuit of said multivibrator, whereby the transistor on the side of said relay coil is put in its conducting state always at the time of starting the device.

Other objects and the means by which said objects are accomplished as well as other features of the present invention will readily be understood from the following description with reference to the accompanying drawing.

The accompanying drawing shows as one embodiment of this invention an electric connection diagram of a transistor relay circuit.

Referring to the drawing, 1 denotes an electric current source, i.e., a storage battery and 2 a starting switch. 3 and 4 denote transistors in a bistable multivibrator circuit, into one portion of which a relay coil 5 and a rectifier diode 6 are inserted in parallel. This diode 6 is an electric element serving to suppress a transient voltage produced in case of interrupting coil current. Resistances 7 and 8 connected with the base electrodes of the transistors 4 and 3, respectively, serve to impart base currents for putting the transistors 4 and 3, respectively, in their conducting states, while a resistance 9 grounded at one end serves as a protective element for keeping the transistors stable in case of blocking. A resistance 10 connected with the collector electrode of the transistor 3 serves as a collector load as usual.

When, instead of the relay coil 5 and the rectifier diode 6 in the circuit shown, a resistance serving as a collector load of the transistor 4 is inserted into said circuit, this circuit becomes that of a conventional bistable multivibrator.

In the circuit shown the time constant $t(t=L/R)$ of the relay coil 5 is selected sufficiently greater than the delay time of each of the transistors.

When the starting switch 2 is closed, an electric current is about to flow through the transistors 3 and 4. The relay coil 5 serving as the collector load of the transistor 4, however, possesses a high impedance at the beginning of voltage impression, owing to inductive reactance. Therefore, within the time constant of the relay coil 5, the collector voltage of the transistor 3 is higher than that of the transistor 4, with the result that a signal current is given through the resistance 7 to the transistor 4, which is made then conductive. On the other hand, at the time of starting no electric current flows through the base circuit of the transistor 3, as this circuit is a series circuit including the resistance 8 and the relay coil 5, but, an electric current to flow through this transistor increases in course of time till a certain value of stationary state. Thus, at the time of starting the transistor 3 remains in its blocking state, but can change into its conducting state in course of time. The arrow shown at the left of the drawing figure represents a signal voltage input for actuation of the bistable multivibrator. This voltage signal is applied between the input terminal, represented by the arrow, and ground and, in accordance with the polarity, with respect to ground, of the input signal, the operation of relay 5 can be controlled. When the input signal is positive, transistor 3 is cut off and transistor 4 becomes conductive. Under these conditions, a current flows through the relay coil to actuate the latter. However, if the input signal is negative with respect to ground, transistor 3 becomes conductive and transistor 4 is blocked. Under this latter condition, no current flows through relay 5 so that the latter is not operated.

Summarizing the operation of the invention, as the switch 2 is closed, a potential is applied to the circuit. The resistance 8 and the inductance L of the relay coil 5 are effective in the collector circuit of the transistor 4. The base bias currents of each of the transistors are derived differently. The base of the transistor 4 has its bias applied thereto immediately upon closure of the switch 2, through the series resistances 7 and 10. On the other hand, at the instant of closing the switch 2, there is no base current for the transistor 3. This is due to the time delay effective as a result of the inductance L of the relay coil 5.

The base bias of the transistor 3 increases to its predetermined value at a rate depending upon the time constant of the circuit. This time constant $t$ is equal to $L/R$, where L is the inductance of the relay coil 5 and R is the resistance of the circuit. Thus, if the time constant $t$ is made longer than the operation time of the transistor, upon closing of switch 2 the transistor 3 is blocked and the transistor 4 becomes conductive immediately. This changes the bistable state into a stable state, which is necessary for operation of the device as a multivibrator.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A transistorized multi-vibrator relay circuit comprising, in combination, first and second transistors; a first resistor in series in the collector circuit of said first transistor; an inductive relay coil in series in the collector circuit of said second transistor; a pair of second resistors each connecting the collector of a respective transistor to the base of the other transistor; means, including a normally open switch, connecting said first resistor and said relay coil in common to one terminal of a potential source; means connecting the two emitters in common to the other terminal of said source; circuit means connected to the base of said first transistor for selectively applying thereto a signal of a preselected polarity with respect to ground; said starting switch, when closed, connecting said first resistor and said relay coil in common to said one terminal whereby biasing potential will be supplied substantially immediately to the base of said second transistor through said first resistor and the respective second resistor connected in series between said first resistor and the base of said second transistor, and application of bias to the base of said first transistor will be delayed due to the inductive reactance of said relay coil in series with the respective second transistor with the base of said first transistor, so that said first transistor will become conductive substantially immediately; the time constant derived from the inductance of said relay coil and the value of the said second resistor connected in series with the base of said first transistor being greater than the operating time of said second transistor so that, upon said second transistor becoming conductive, said first transistor is blocked and the relay circuit acts as a monostable multivibrator; said circuit means, when the input signal thereto has a positive polarity with respect to ground, blocking said first transistor and maintaining conductivity of said second transistor and, when the signal applied thereto has a negative polarity with respect to ground, triggering said first transistor to be conductive and blocking said second transistor; whereby said inductive relay coil will be energized when the signal applied to said circuit means has said relatively positive polarity and will be de-energized when the signal applied to said circuit means has a relatively negative polarity, so that said relay circuit will act as a bistable multi-vibrator.

References Cited by the Examiner

UNITED STATES PATENTS

| | | | |
|---|---|---|---|
| 2,806,153 | 9/57 | Walker | 307—88.5 |
| 2,901,639 | 8/59 | Woll | 307—88.5 |
| 2,949,582 | 8/60 | Silliman | 331—113 |
| 3,015,477 | 1/62 | Persson et al. | |
| 3,041,477 | 6/62 | Budts et al. | |

OTHER REFERENCES

"Transistor Manual," General Electric Co., 2nd edition, page 33, published prior to April 1, 1958.

SAMUEL BERNSTEIN, *Primary Examiner.*

WALTER L. CARLSON, *Examiner.*